(No Model.)
W. K. HAWK.
NUT LOCK.
No. 422,346. Patented Feb. 25, 1890.
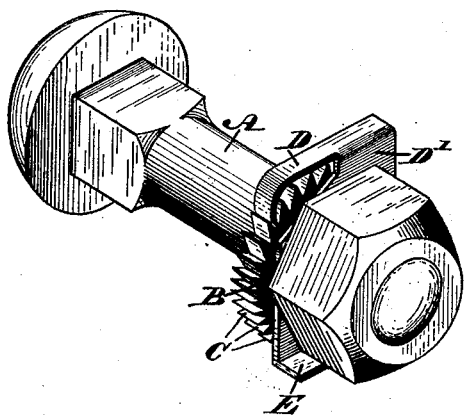
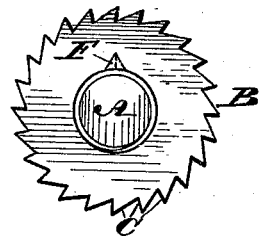
Witnesses
L. Douville,
A. P. Jennings.
Inventor
Wayne K. Hawk
By his Attorneys
Hiedersheim & Kutner

United States Patent Office.

WAYNE K. HAWK, OF PHILADELPHIA, PENNSYLVANIA.

NUT-LOCK.

SPECIFICATION forming part of Letters Patent No. 422,346, dated February 25, 1890.

Application filed January 5, 1889. Serial No. 295,542. (No model.)

*To all whom it may concern:*

Be it known that I, WAYNE K. HAWK, a citizen of the United States, residing in the city and county of Philadelphia, State of Pennsylvania, have invented a new and useful Improvement in Nut-Fasteners, which improvement is fully set forth in the following specification and accompanying drawings.

My invention consists of improvements in nut-fasteners embodying ratchet-washers and spring teeth or dogs, which are connected with the nuts and engage with said washers, all as will be hereinafter fully set forth and claimed.

Figure 1 represents a perspective view of a nut-fastener embodying my invention. Fig. 2 represents a front view showing the washer and its connection with the bolt.

Similar letters and numerals of reference indicate corresponding parts in the several figures.

Referring to the drawings, A designates a bolt, which is of usual construction.

B designates a washer, which is fitted on the bolt or may be part of a fish-plate, the same having ratchet-teeth C on its periphery, with which engages the spring tooth or dog D, consisting of a plate D', of metal, having a part of the same cut and bent, forming said tooth or dog D, and one side turned up, forming the lip E, which is adapted to engage with one of the sides of the head of the bolt, the plate having an opening to receive the bolt.

The ratchet-wheel is provided with a teat F, which enters a recess, notch, or slot in the fish-plate, so that the ratchet is prevented from rotation, it being seen that when the washer-tooth and nut are applied to the bolt the latter is rotated and the tooth is carried by the same and rides over the teeth of the ratchet, so that when the nut is tightened it is prevented from unscrewing, owing to the engagement of the tooth D with one of the teeth of the ratchet-washer. By having the ratchet-teeth on the periphery of the washer the tooth D, while the nut is being screwed into position, is prevented from being compressed by said nut, and thus it is permitted to be rotated freely around the ratchet and the nut further tightened without affecting said tooth.

I am aware that it is not new to construct a nut lock or fastener having a plate with radial corrugations thereon adapted to be secured to a fish-plate, and a spring-plate with pawls adapted to ride or sweep in either direction over said corrugations; neither is it new to form a nut with ratchet-teeth and to provide a plate with a dog controlled by a spring and adapted to engage said ratchet on the nut; neither is it new to employ a spring-washer with slits and a ratchet-ring; nor to construct a fastener of a stationary flanged plate with a central orifice, a ratchet-disk with sleeve, a nut-cap rigidly connected with said sleeve, and a pawl engaging the ratchet-disk. Such constructions are old and well known; but I am not aware that the construction herein described and claimed is old, wherein a disk having ratchet-teeth on its periphery is employed in connection with a plate having a spring-pawl or tooth overhanging or encircling the periphery of the disk, as shown in Fig. 2, the said pawl being adapted to engage the said disk-teeth, the said plate being also provided with a lip on the opposite end thereof from the pawl, the said lip and pawl being integral with the plate, and the lip being adapted to hold the nut in place.

Having thus described my invention, what I claim as new, and desire to secure by Letters Patent, is—

A nut-lock consisting of a disk provided with ratchet-teeth on its periphery, a plate with pawl overhanging and engaging said teeth and provided with a lip adapted to hold the nut in place, said parts being combined substantially as described.

WAYNE K. HAWK.

Witnesses:
JOHN A. WIEDERSHEIM,
A. P. JENNINGS.